(12) United States Patent
Fujii et al.

(10) Patent No.: US 6,747,776 B2
(45) Date of Patent: Jun. 8, 2004

(54) SEMICONDUCTOR OPTICAL MODULATOR, OPTICAL MULTIPLEXING MODULE, AND CONTROL METHOD THEREOF

(75) Inventors: Kozo Fujii, Tokyo (JP); Yukihiro Ozeki, Fujisawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/253,486

(22) Filed: Sep. 25, 2002

(65) Prior Publication Data

US 2003/0081301 A1 May 1, 2003

(30) Foreign Application Priority Data

Oct. 26, 2001 (JP) ........................................ 2001-328495

(51) Int. Cl.$^7$ ............................... G02F 1/01; H01S 3/10
(52) U.S. Cl. ......................... 359/240; 359/237; 372/28; 372/32; 372/50
(58) Field of Search ................................. 359/237, 240, 359/245, 246, 247, 248; 385/1, 2, 3, 8, 131; 257/14, 80, 94, 96; 372/28, 32, 50

(56) References Cited

U.S. PATENT DOCUMENTS 5,546,218 A  *  8/1996  Komatsubara et al. ...... 359/237
5,550,855 A  *  8/1996  Aoyagi et al. ................ 372/50
5,883,914 A  *  3/1999  Kinoshita ..................... 372/50

OTHER PUBLICATIONS

Koji Yamada et al., "Double–passing electroabsorption Modulator For High–Speed Modulation", First Optoelectronics And Communications Conference (OECC '96) Technical Digest, pp. 178–179, (1996).

* cited by examiner

Primary Examiner—Hung X. Dang
Assistant Examiner—Tuyen Tra
(74) Attorney, Agent, or Firm—Venable LLP; Michael A. Sartori

(57) ABSTRACT

A semiconductor optical modulator having an electroabsorptive layer and a pair of modulating voltage electrodes also has a direct-current voltage electrode, from which an unmodulated electric field can be applied to the electroabsorptive layer to adjust the output optical power level. The output optical power level can thus be adjusted without the need for an external attenuator, and without shifting the modulating voltage away from the part of the extinction ratio characteristic having the best linearity. An optical multiplexing module using semiconductor optical modulators of this type can generate a multiplexed output signal with a uniform optical power level simply by controlling the direct-current voltages applied to the semiconductor optical modulators.

8 Claims, 10 Drawing Sheets

SEMICONDUCTOR OPTICAL MODULATOR, OPTICAL MULTIPLEXING MODULE, AND CONTROL METHOD THEREOF

BACKGROUND OF THE INVENTION

1. Field of the Invention

The present invention relates to an optical modulator used for optical communication and an optical multiplexing module using a plurality of such optical modulators. More particularly, it relates to a semiconductor optical modulator of the electroabsorptive type, and to an optical multiplexing module using a plurality of electroabsorptive modulators.

2. Description of the Related Art

A block diagram of a conventional optical multiplexing module having a multiplexing factor of two is shown in FIG. 6A. The optical multiplexing module 50 includes a combiner 1 that combines a pair of optical signals into an output optical signal LTt, a first modulator 2 that modulates a source optical signal LTs according to a first modulating voltage Vm1, a second modulator 3 that modulates the source optical signal LTs according to a second modulating voltage Vm2, a pair of attenuators 4, 5 that attenuate the optical power of the source optical signal LTs, and a splitter 6 that splits the source optical signal LTs into two signals for output to the two attenuators 4 and 5.

From the splitter 6, the source optical signal follows a path of optical length L1 through the first attenuator 4 and first modulator 2 to the combiner 1, and another path of optical length L2 through the second attenuator 5 and second modulator 3 to the combiner 1. The source signal comprises, for example, a regularly spaced series of narrow pulses of light, which are modulated in the modulators 2 and 3. Even though a source light pulse enters the two paths simultaneously, if path length L2 is longer than path length L1, the two modulated light pulses will reach the combiner 1 at different timings. Time-division multiplexing can be performed by setting the path length L2 so that the timing difference is equal to one-half the interval between successive output pulses from the first modulator 2.

The two modulators 2 and 3 ideally have identical insertion losses. In practice, however, fabrication inaccuracies may lead to different insertion losses.

FIG. 7 shows a perspective view of the structure of one example of a conventional semiconductor optical modulator. Formed as a semiconductor chip by the use of semiconductor fabrication technology, the semiconductor optical modulator 20 includes an electroabsorptive layer 21 that absorbs light to different degrees depending on an electric field intensity, a p-type clad layer 22 disposed above the electroabsorptive layer 21, an n-type clad layer 23 disposed below the electroabsorptive layer 21, polyimide layers 24, disposed on the right and left sides of the electroabsorptive layer 21, a contact layer 26 disposed above the p-type clad layer 22, and a pair of modulating voltage electrodes 27, 28 disposed respectively above the contact layer 26 and below the n-type clad layer 23.

If incident light LTin (the source optical signal LTs) enters the electroabsorptive layer 21 as indicated by the arrow in FIG. 7, and a modulating voltage Vm1 is applied to the modulating voltage electrode 27 while the lower electrode 28 is grounded, the electroabsorptive layer 21 absorbs the incident light LTin to different degrees, responsive to the modulating voltage Vm1; consequentially, a modulated light signal is output from the electroabsorptive layer 21. The electroabsorptive layer 21 has a limited light-absorbing capability per unit length, however, so to provide a modulation depth adequate for optical communication, the semiconductor optical modulator 20 must have at least a certain necessary length, this being the dimension of the electroabsorptive layer 21 in the direction of light propagation.

The modulators in general use are of the transmissive type, in which incident light enters at one end and is output from the other end. The necessary length dimension can be reduced by half, however, by using modulators of the reflective type, in which light enters and exits at the same end. In this case, the modulators are coupled to their respective light paths by optical circulators, not shown in the drawings.

FIG. 8A shows a typical example of the optical power level of the output optical signal LTt in the optical multiplexing module 50 in FIG. 6A when the first attenuator 4 and second attenuator 5 are not controlled, that is, when the power level of the output optical signal is not adjusted. The optical power level OPS2 of signals S2-1 and S2-2 from the second modulator 3 exceeds the optical power level OPS1 of signals S1-1 and S1-2 from the first modulator 2 by a value D. This power difference D may arise because of an unequal splitting ratio in the splitter 6, or because the absorption characteristics (extinction ratios) of the first modulator 2 and second modulator 3 differ, due to differing fabrication conditions.

In the conventional optical multiplexing module 50 in FIG. 6A, the first attenuator 4 and the second attenuator 5 adjust the power level of the source optical signal LTs so as to suppress this power difference D.

An optical multiplexing module is also known that adjusts the power levels of the output optical signals to a constant value OPSs by controlling the modulating voltages as shown in FIG. 6B, instead of by using attenuators. In place of the attenuators 4 and 5 in FIG. 6A, the optical multiplexing module 51 in FIG. 6B has a first modulating voltage controller 7 that biases the modulating voltage Vm1 input to the first modulator 2, and a second modulating voltage controller 8 that biases the modulating voltage Vm2 input to the second modulator 3, thereby adjusting the power levels of the optical signals output from the first modulator 2 and the second modulator 3 to a uniform level OPSs.

Due to differing fabrication conditions or an insufficiently accurate fabrication process, however, the two modulators 2, 3 may have different extinction ratio characteristics, and thus respond differently to biasing of the modulating voltage, making a uniform output level difficult to achieve. For example, one modulator may operate in a linear region of its extinction ratio characteristic, while the other modulator operates in a nonlinear region. This is particularly apt to occur when modulators of the reflective type mentioned above are used, since their extinction ratio characteristics tend to show more non-linearity than is seen in modulators of the transmissive type.

FIG. 9 shows examples of the extinction ratio characteristics of electroabsorptive modulators of the reflective type (solid line) and transmissive type (dotted line). If a reflective modulator having the extinction ratio characteristic indicated by the solid line in FIG. 9 is employed, and if the modulating voltage is biased at minus one volt (−1 V) with an amplitude of ±1 V, then the excellent linearity of the extinction ratio characteristic from 0 V to −2 V can be used. If the bias voltage is set to −2 V, however, then the amplitude of the modulating voltage extends into the region of poorer linearity below −2 V. Moreover, even if the bias voltage is set to −1 V, if the amplitude of the modulating voltage exceeds ±1 V, then the region of poor linearity in the extinction ratio characteristic below −2 V must be used.

If the optical multiplexing module 50 in FIG. 6A uses semiconductor optical modulators 20 having the imperfectly linear extinction ratio characteristics described above, then even though the optical power levels of the optical signals output from the modulators are adjusted to a constant value OPSs by the use of attenuators, fabrication variations and the non-linearity of the extinction ratio characteristics of the semiconductor optical modulators may cause the modulating fields generated by the modulating voltages Vm1 and Vm2 to have varying effects, so that the modulated output signals vary as shown in FIG. 8B, leading to transmission quality problems such as an inadequate modulation depth.

If the optical multiplexing module 51 in FIG. 6B uses semiconductor modulators having imperfectly linear extinction ratio characteristics, then it may be impossible to adjust the power levels of the optical signals output from the two modulators 2 and 3 to a constant value OPSs without bringing at least one of the modulating voltages Vm1 and Vm2 into the nonlinear region of the extinction ratio characteristic of the corresponding modulator, so that, as shown in FIG. 8B, identical and adequate modulation depths are not obtained.

SUMMARY OF THE INVENTION

An object of the present invention is to provide an optical multiplexing module having a uniform modulated output level despite fabrication variations and imperfectly linear extinction ratio characteristics.

Another object of the invention is to provide an optical multiplexing module having a simplified structure.

Yet another object of the invention is to provide a semiconductor optical modulator for use in such an optical multiplexing module.

To achieve the last of these objects, the invention provides a semiconductor optical modulator having an electroabsorptive layer, a pair of modulating voltage electrodes, and a direct-current voltage electrode. The electroabsorptive layer absorbs incident light responsive to an electric field generated by a modulating voltage applied to the modulating voltage electrodes. The electroabsorptive layer also absorbs incident light responsive to an electric field generated by a direct-current voltage applied to the direct-current voltage electrode. The direct-current voltage can be adjusted to set the optical power level of the modulated output light signal to a desired value. For example, the direct-current voltage can be increased until the optical power level is reduced to a predetermined target level.

Since the output optical power level of the invented semiconductor optical modulator is controlled by direct control of absorption in the electroabsorptive layer, accurate absorption control is possible despite fabrication variations.

The direct-current voltage electrode may be disposed so that it is positionally in series with one of the modulating voltage electrodes in the direction of light propagation. The output power level of the semiconductor optical modulator can then be controlled without shifting the modulating voltage away from the optimal or most linear part of the extinction ratio characteristic.

The semiconductor optical modulator may also have a reflective film on one facet that reflects light back to an incident facet, so that the light traverses the electroabsorptive layer twice.

The invention further provides an optical multiplexing module having a plurality of semiconductor optical modulators as described above, and at least one direct-current voltage controller for adjusting the direct-current voltage supplied to the direct-current voltage electrode of at least one of the semiconductor optical modulators, so as to equalize the optical power levels of light output from the plurality of semiconductor optical modulators. Preferably, one direct-current voltage controller is provided for each semiconductor optical modulator. In this case, the optical power level of the multiplexed signal output from the optical multiplexing module can be controlled by first applying modulating voltages without applying direct-current voltages, detecting the optical power levels of the light signals output from the individual semiconductor optical modulators, setting a target optical power level equal to or less than the minimum detected optical power level, and then controlling the direct-current voltages supplied to the semiconductor optical modulators so that light is output from each semiconductor optical modulator at the target optical power level.

The structure of the invented optical multiplexing module is simplified because it is not necessary to use external attenuators or bias the modulating voltage signals, and a uniform optical power level can be obtained even with optical modulators, such as reflective optical modulators, having significantly nonlinear extinction ratio characteristics.

DETAILED DESCRIPTION OF THE INVENTION

Figure 1:
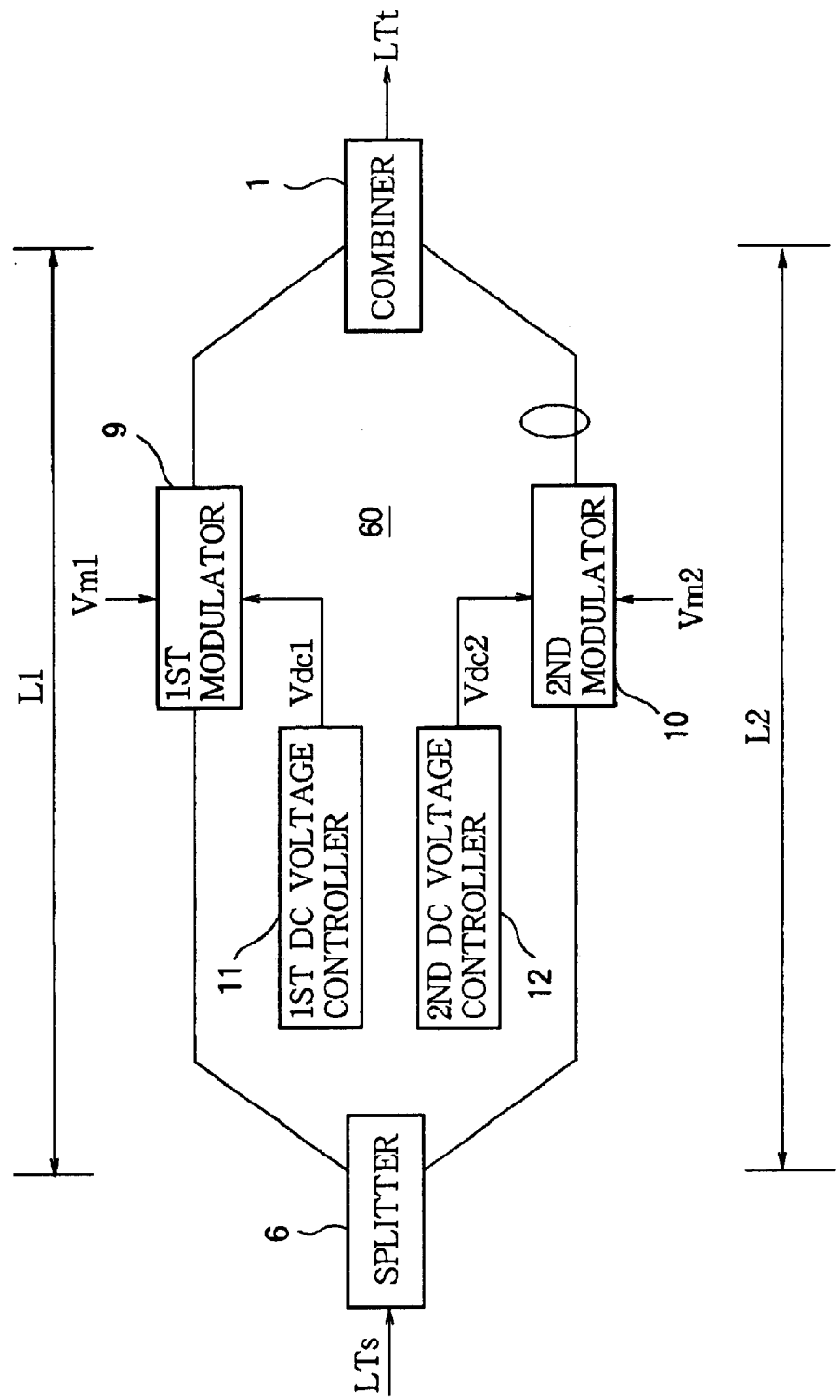
FIG. 1 is a block diagram of an optical multiplexing module according to a first embodiment of the invention.

Embodiments of the invention will now be described with reference to the attached drawings, in which like elements are indicated by like reference characters.

FIG. 1 shows an optical multiplexing module 60 according to a first embodiment. Differing from the conventional optical multiplexing module 51 shown in FIG. 6B, the optical multiplexing module 60 in FIG. 1 has no first modulating voltage controller 7 or second modulating voltage controller 8 to control the modulating voltages applied to the first modulator and second modulator. Instead, a first direct-current (DC) voltage controller 11 controls a direct-current voltage applied to the first modulator 9, and a second DC voltage controller 12 controls a direct-current voltage applied to the second modulator 10. The combiner 1 and splitter 6 are similar to the corresponding elements in the conventional optical multiplexing modules in FIGS. 6A and 6B.

Unlike the conventional optical multiplexing modules, the optical multiplexing module 60 in the first embodiment neither attenuates the source optical signal LTs input to the modulators 9 and 10 nor adjusts the modulating voltages Vm1 and Vm2; the only control performed is control of the direct-current voltages applied to the first modulator 9 and the second modulator 10 by the first DC voltage controller 11 and the second DC voltage controller 12.

If the source optical signal LTs consists of narrow optical pulses with a pulse repetition rate of 2.5 gigahertz (2.5 GHz), for example, and if the difference between the optical path length L1 extending through the first modulator 9 and the optical path length L2 extending through the second modulator 10 between the splitter 6 and the combiner 1 is substantially four centimeters (4 cm), then in the optical signal output from the combiner 1, the 2.5-GHz optical pulses from one optical path are interleaved with the 2.5-GHz optical pulses from the other optical path with a timing difference substantially equal to one-half the interval between successive pulses on each path, creating a 5.0-GHz time-division multiplexed output signal.

Figure 2:
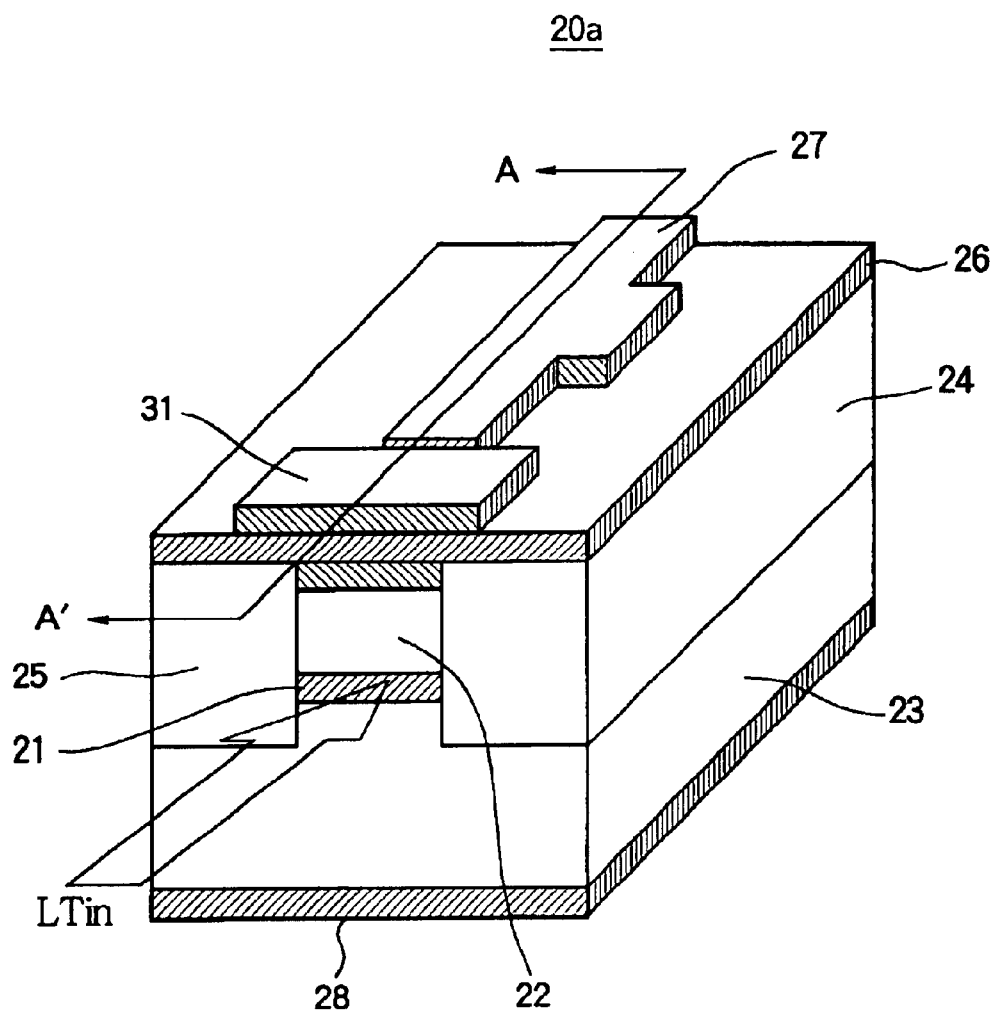
FIG. 2 shows a perspective view of the structure of a semiconductor optical modulator in the first embodiment.

FIG. 2 shows a perspective view of the structure of a semiconductor optical modulator 20a used in the first embodiment.

Figure 7:
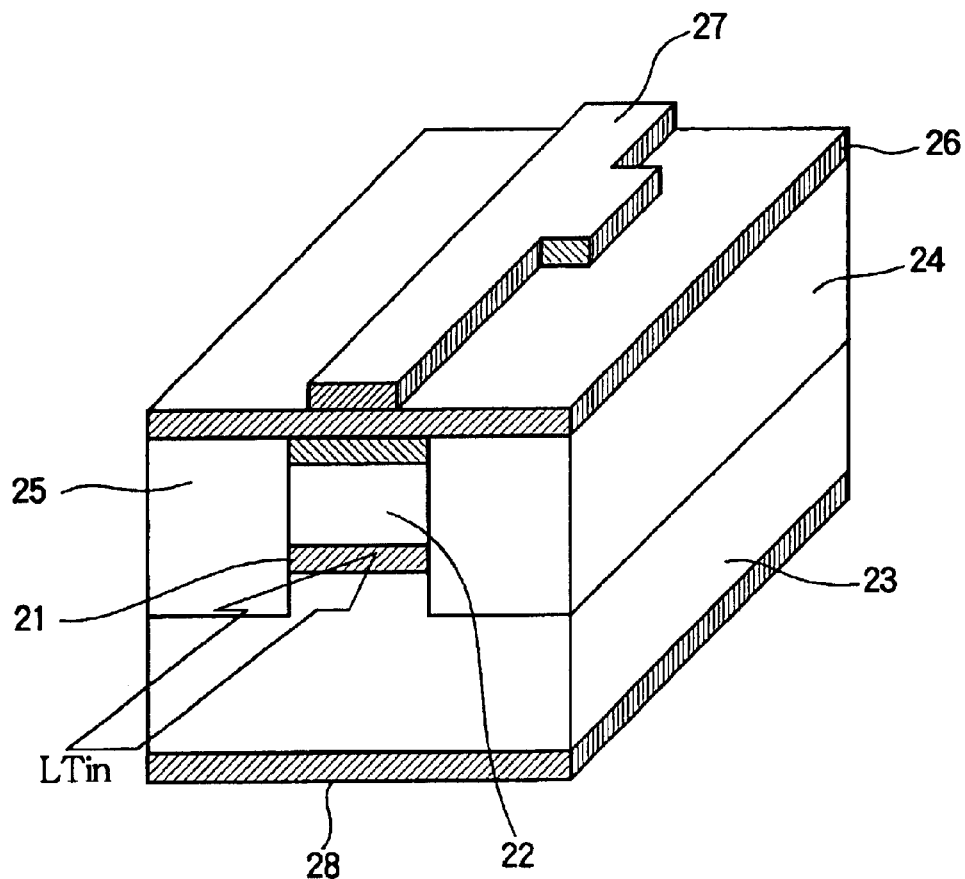
FIG. 7 shows a perspective view of the structure of an example of a conventional semiconductor optical modulator.

Differing from the conventional semiconductor optical modulator 20 shown in FIG. 7, the semiconductor optical modulator 20a in FIG. 2 has a DC voltage electrode 31 added for applying a DC electric field to the electroabsorptive layer 21. The DC voltage electrode 31 is disposed so that it is positionally in series with the modulating voltage electrode 27 in the direction of propagation of incident light LTin. The direct-current voltage applied to the DC voltage electrode 31 is controlled by the first DC voltage controller 11 or second DC voltage controller 12 in FIG. 1, thereby reducing the optical power level of the output optical signal to a predetermined value such as the optical power level OPSs in FIG. 8B.

Figure 3:
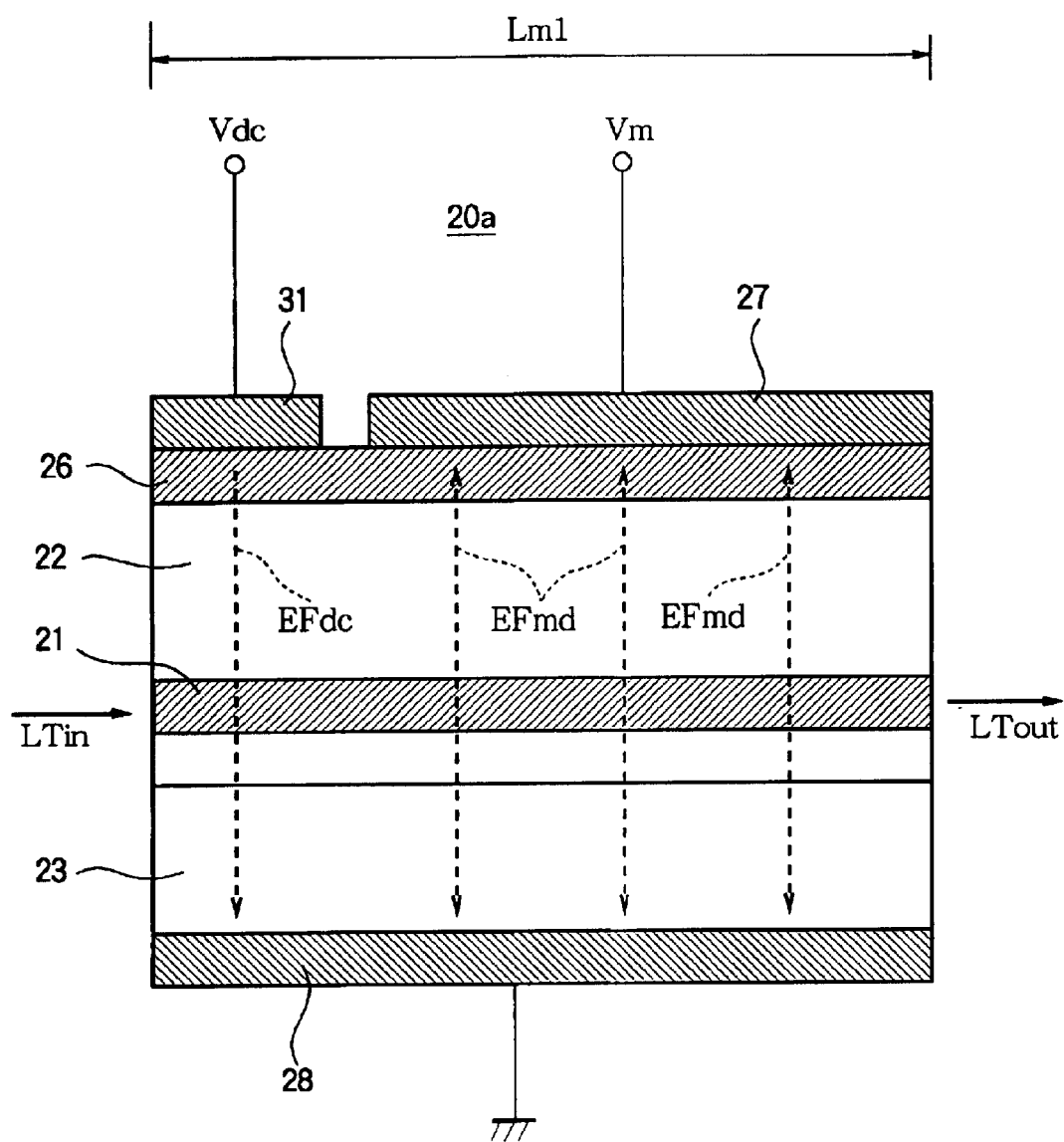
FIG. 3 shows a cross-sectional view through line A–A' in the semiconductor optical modulator in FIG. 2.

FIG. 3 is a cross-sectional view through line A–A' in the semiconductor optical modulator 20a in FIG. 2.

In the semiconductor optical modulator 20a, a direct-current electric field EFdc is generated between the DC voltage electrode 31 and the lower electrode 28 by the applied direct-current voltage Vdc, and a modulating field EFmd is generated between the modulating voltage electrode 27 and the lower electrode 28 by the applied modulating voltage Vm.

When the direct-current electric field EFdc is absent, the modulating field EFmd has the same effect as the modulating field in a conventional modulator. When the direct-current electric field EFdc is present, it adds an additional effect, thereby reducing the power level of the output optical signal LTout, without changing the effect of the modulating field EFmd. There is no significant area overlap of the modulating field EFmd and the direct-current electric field EFdc in the electroabsorptive layer 21. The power level of the output optical signal LTout can thus be adjusted to a desired level by adjusting the direct-current voltage Vdc, thereby adjusting the direct-current electric field EFdc, while keeping the modulating field EFmd in the linear part of the extinction ratio characteristic.

The optical multiplexing module 60 in the first embodiment uses the semiconductor optical modulator 20a described above as the first modulator 9 and second modulator 10, controlling the direct-current voltages applied to these modulators by the first DC voltage controller 11 and second DC voltage controller 12, thereby equalizing the optical power levels of the pulses in the multiplexed output optical signal LTt.

Figure 4A:
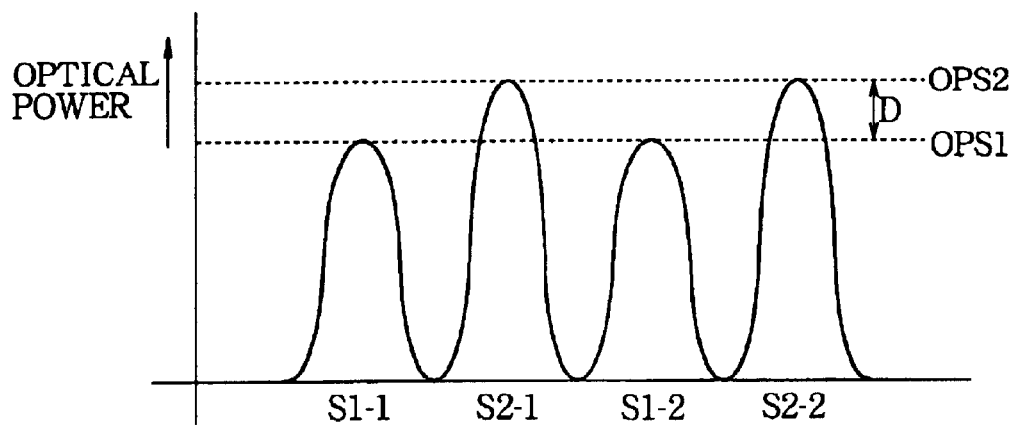
FIG. 4A shows an example of the power level of the optical signal output from the optical multiplexing module in FIG. 1 when the optical output levels of the individual modulators are not adjusted.
Figure 8A:
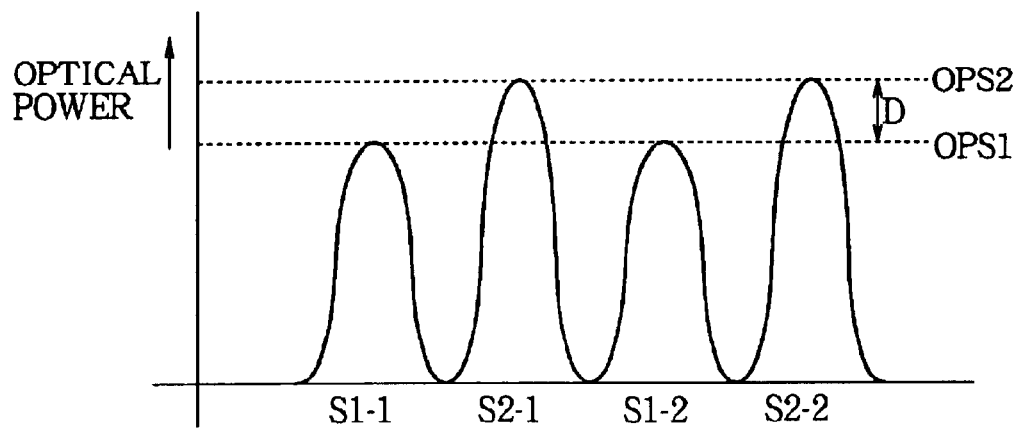
FIG. 8A shows an example of the optical power level of the optical signal output from the optical multiplexing module in FIG. 6A when the optical input power levels of the individual modulators are not adjusted.
Figure 8B:
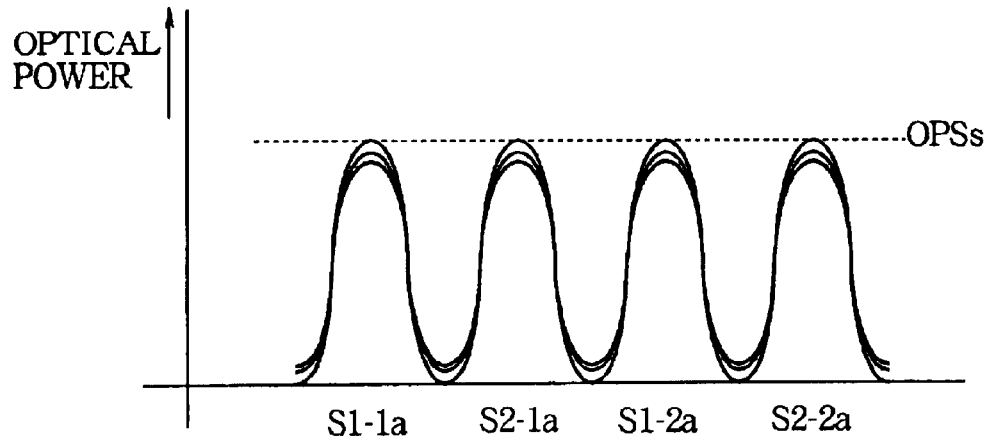
FIG. 8B shows the example in FIG. 8A after adjustment of the optical input power levels of the individual modulators.

FIG. 4A shows the optical power level of the output optical signal LTt in the optical multiplexing module 60 in FIG. 1 when the first DC voltage controller 11 and second DC voltage controller 12 are not controlled, that is, when the power levels of the output optical signals LTout from the modulator are not adjusted, as in the conventional optical multiplexing module in FIG. 8A.

Figure 4B:
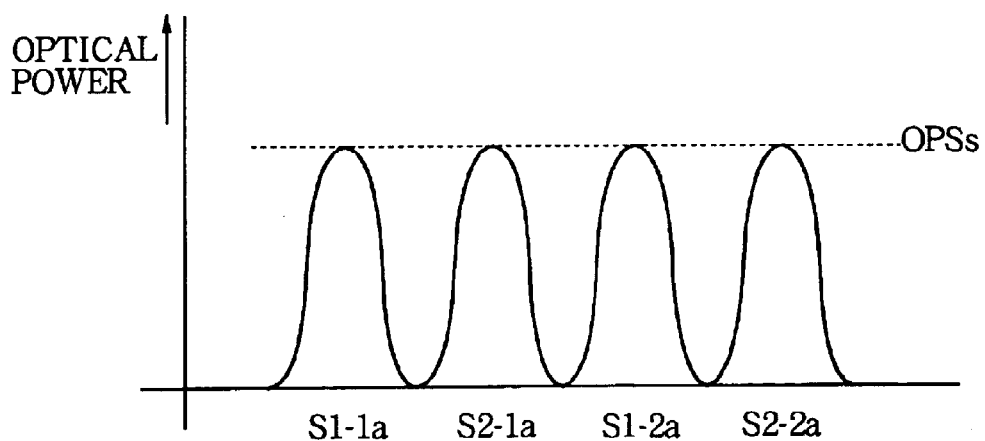
FIG. 4B shows the example in FIG. 4A after adjustment of the optical output levels of the individual modulators.

FIG. 4B shows the power level of the multiplexed optical signal LTt output from the optical multiplexing module 60 in FIG. 1 when the first DC voltage controller 11 and second DC voltage controller 12 are controlled, that is, when the power levels of the output optical signals LTout from the individual modulators are adjusted. Even if the semiconductor optical modulator 20a in FIG. 2 has an extinction ratio characteristic with poor linearity, if the output optical power levels of the modulators are adjusted to a constant value OPSs without shifting the modulating field EFmd generated by the modulating voltages Vm1 and Vm2 away from the linear part of the extinction ratio characteristic, the optical signal LTt output from the optical multiplexing module 60 will be free of the type of variations shown in FIG. 8B.

A preferred method of controlling the optical multiplexing module 60 in the first embodiment begins by, for example, applying the modulating voltage Vm (Vm1 or Vm2) to the modulating voltage electrode 27 without applying the direct-current voltage Vdc to the DC voltage electrode 31 in the first modulator 9 and the second modulator 10, detecting the power levels of the optical signals LTout output from the first modulator 9 and the second modulator 10, and selecting an optical power level (e.g., OPSs) equal to or lower than the lowest detected optical power level; then the first DC voltage controller 11 and the second DC voltage controller 12 are controlled so as to increase the direct-current voltages Vdc applied to the DC voltage electrodes 31 until the optical power level of the output optical signal LTt from the optical multiplexing module 60 is uniformly reduced to the selected optical power level (e.g., OPSs).

As described above, the optical multiplexing module 60 in the first embodiment uses a pair of semiconductor optical modulators 20a, having respective DC voltage electrodes 31, as the first modulator 9 and the second modulator 10, and includes a first DC voltage controller 11 and second DC voltage controller 12 capable of adjusting the direct-current voltages Vdc applied to the voltage electrodes 31 of the first modulator 9 and second modulator 10. The DC voltage controllers 11, 12 control the direct-current voltages Vdc so as to bring the optical power levels of the optical signals LTout output from the first modulator 9 and the second modulator 10 to a selected level (OPSs). The power level of the combined optical signal LTt output from the optical multiplexing module 60 does not vary, even if the semiconductor optical modulators exhibit fabrication variations and have extinction ratio characteristics with poor linearity. The uniform modulated output levels of the optical multiplexing module 60 and semiconductor optical modulator 20a improve the reliability of communication using the multiplexed output signal.

Figure 6A:
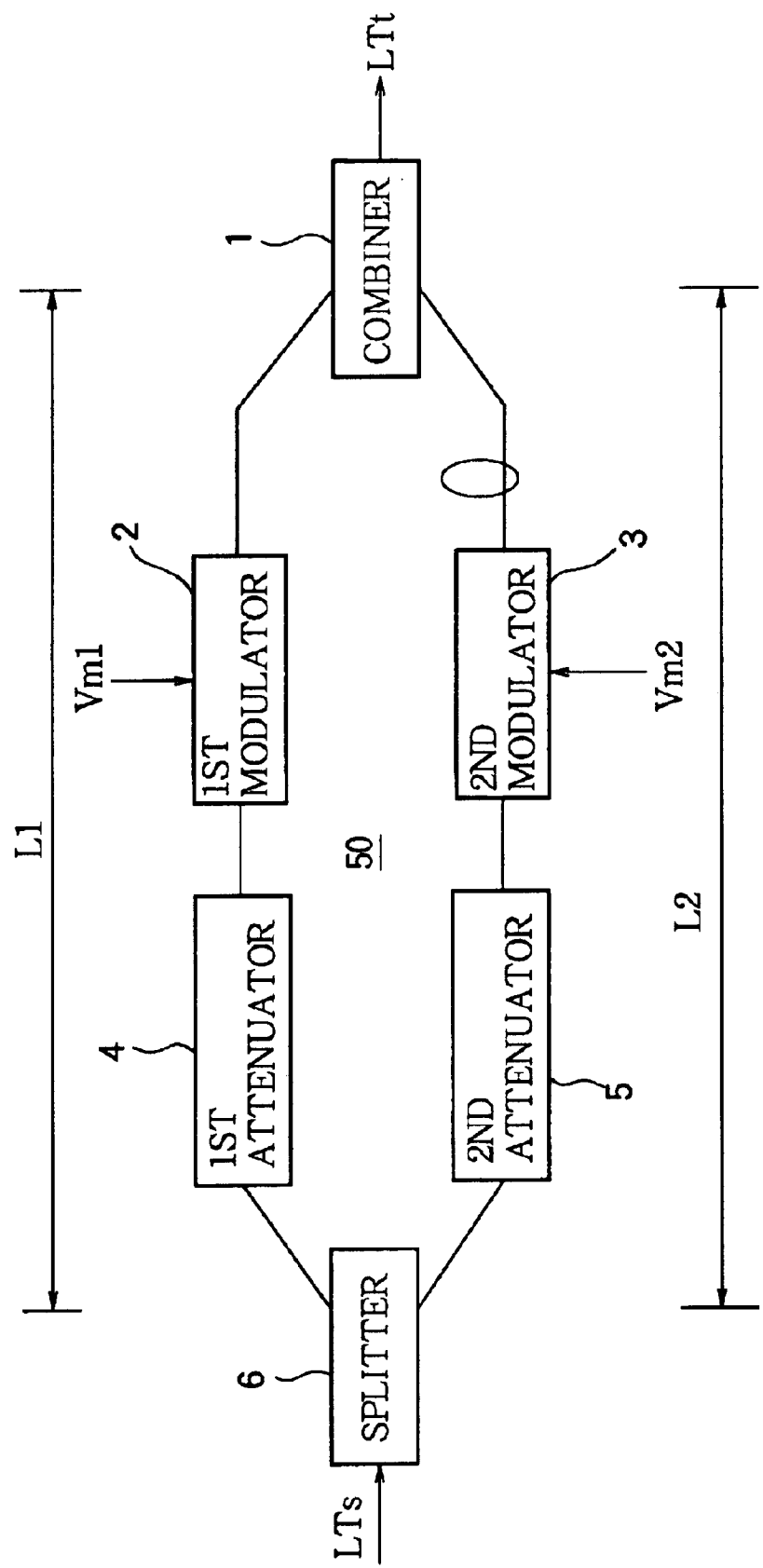
FIG. 6A is a block diagram of a conventional optical multiplexing module used for optical communication with a multiplexing factor of two.
Figure 6B:
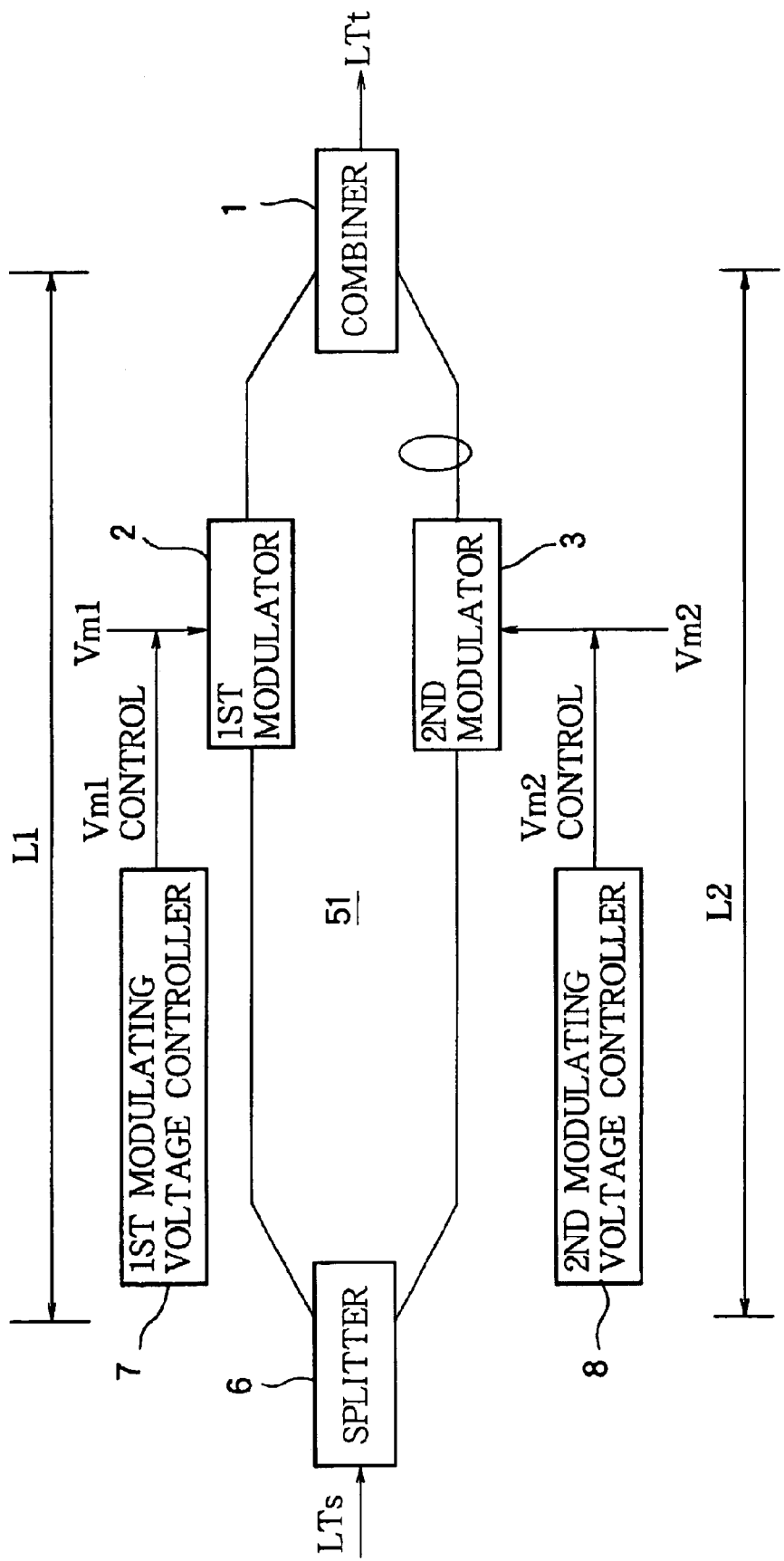
FIG. 6B is a block diagram of another conventional optical multiplexing module used for optical communication with a multiplexing factor of two.

Compared with the conventional optical multiplexing module 50 in FIG. 6A, the optical multiplexing module 60 in the first embodiment has a simpler structure because it does not require external attenuators. Compared with the conventional optical multiplexing module 51 in FIG. 6B, the optical multiplexing module 60 in the first embodiment has a simpler structure because it does not require means for adding bias voltages to the modulating voltages. The cost of the optical multiplexing module 60 is therefore lower than the cost of the conventional optical multiplexing modules.

Since the DC voltage electrode 31 that applies a direct-current electric field EFdc to the electroabsorptive layer 21 in the semiconductor optical modulator 20a in the first embodiment is positionally in series with the modulating voltage electrode 27, in the direction of light propagation, the optical power level of the output optical signal LTout can be controlled while keeping the modulating electrode field EFmd within a part of the extinction ratio characteristic that exhibits good linearity, so that a uniform modulated output level is obtained.

Figure 5:
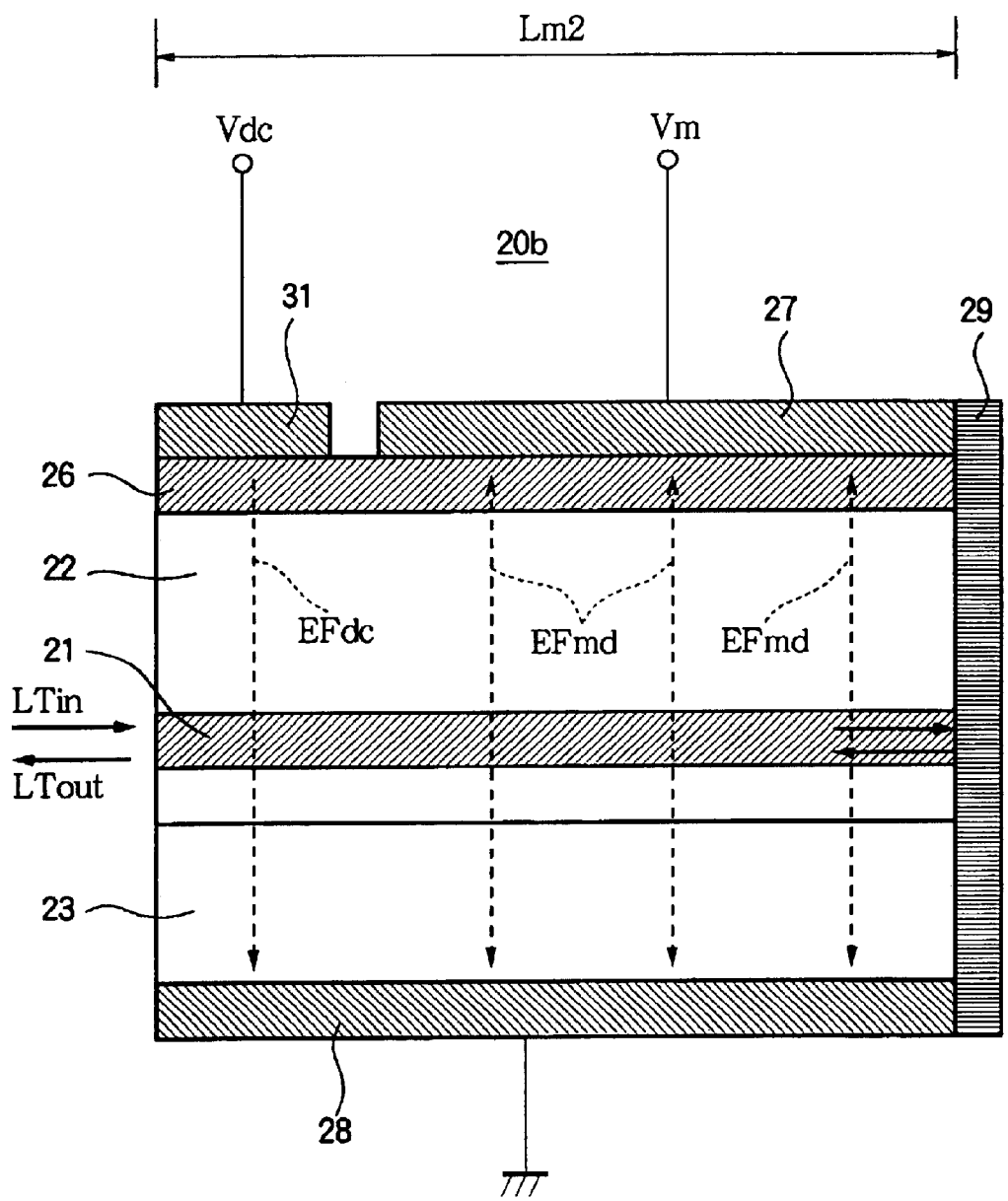
FIG. 5 shows a cross-sectional view of a semiconductor optical modulator used in a second embodiment.

FIG. 5 is a cross-sectional view of a semiconductor optical modulator 20b used in a second embodiment of the invented optical multiplexing module.

The semiconductor optical modulator 20b in FIG. 5 includes a reflective film 29 at what was the output facet of the semiconductor optical modulator 20a in the first embodiment in FIG. 3. The reflective film 29 is a totally reflecting coating. Since incident light LTin is absorbed while passing in both directions through the electroabsorptive layer 21, the length Lm2 of the semiconductor optical modulator 20b can be reduced to substantially one-half the length Lm1 of the semiconductor optical modulator 20a in FIG. 3. If the dimension Lm1 in FIG. 3 is two hundred sixty micrometers (260 μm), for example, the dimension Lm2 in FIG. 5 can be shortened to 130 μm.

The other elements in the optical multiplexing module in the second embodiment are similar to the corresponding elements in the first embodiment described above.

Figure 9:
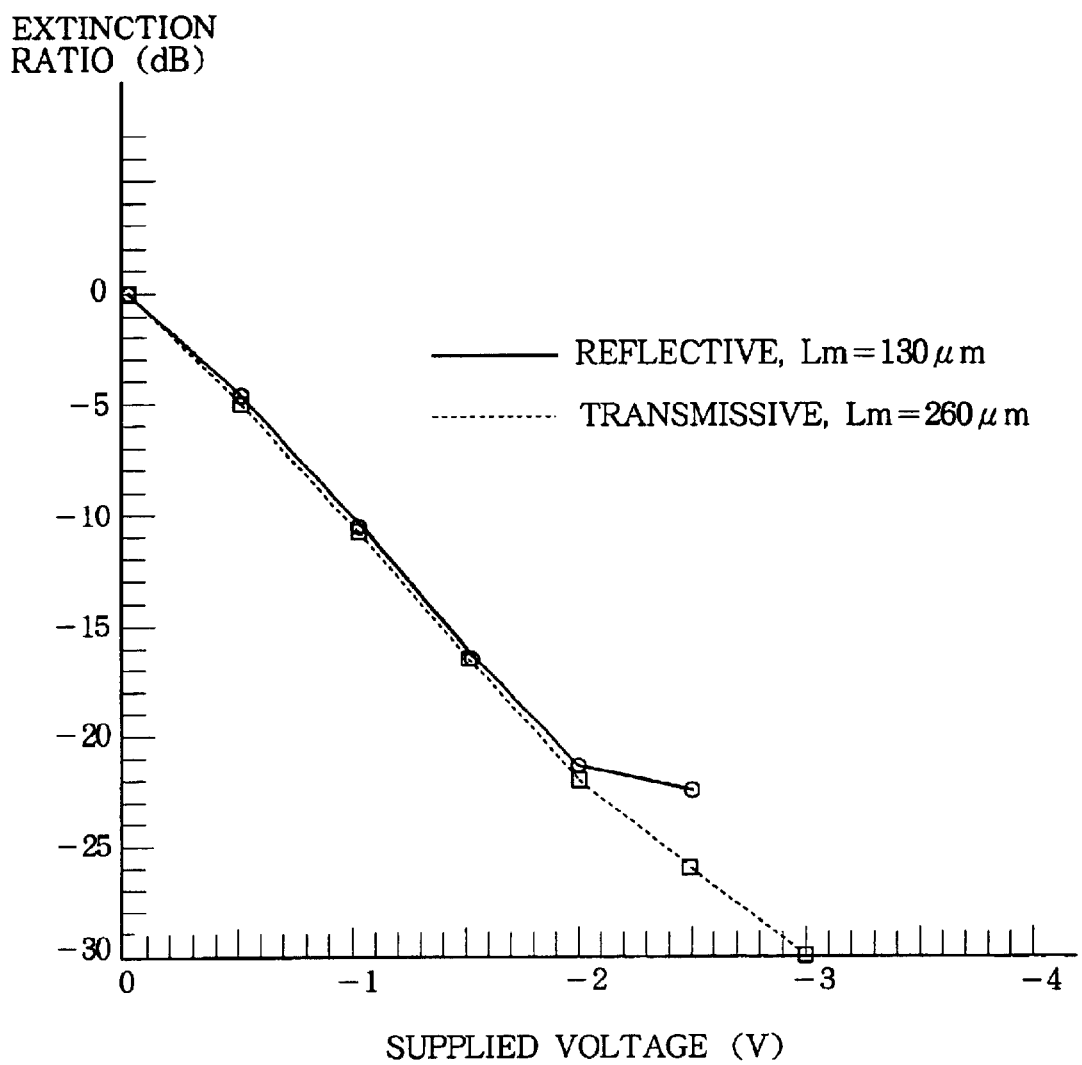
FIG. 9 shows examples of the extinction ratio characteristics of reflective and transmissive semiconductor optical modulators.

If the semiconductor optical modulator 20b is used in a conventional optical multiplexing module, the comparatively poor linearity of its extinction ratio characteristic, as shown in FIG. 9, tends to cause variations in the modulated output signal level, leading to degradation of transmission quality as described above.

The optical multiplexing module in the second embodiment, however, controls the direct-current voltages Vdc1 and Vdc2 applied to the first modulator 9 and second modulator 10 while keeping the modulating voltage in the region from 0 V to −2 V in which the extinction ratio characteristic shows good linearity, without shifting the modulating field EFmd onto the nonlinear part of the extinction ratio characteristic below −2 V. Accordingly, even though the optical multiplexing module in the second embodiment uses semiconductor optical modulators of the reflective type, a uniform modulated, multiplexed output level is obtained, thereby improving the reliability of multiplexed communication systems in which reflective semiconductor optical modulators are employed.

As described above, an optical multiplexing module according to the present invention uses a plurality of semiconductor optical modulators having respective electrodes for receiving direct-current voltages, and includes direct-current voltage controllers capable of adjusting of the direct-current voltages applied to these electrodes. The direct-current voltage controllers control the direct-current voltages so as to bring the optical power levels of the optical signals output from the modulators to a selected level, so that the optical power level of the multiplexed output optical signal does not vary. The optical multiplexing module can thus be adjusted to a uniform modulated output level, even if the semiconductor optical modulators exhibit fabrication variations and have extinction ratio characteristics with poor linearity. The uniform modulated output level of the optical multiplexing module improves communication reliability and prevents degradation of transmission quality.

Since the invented optical multiplexing module adjusts the direct-current voltages while keeping the modulating voltage within the part of the extinction ratio characteristic that exhibits good linearity, without shifting the modulating fields onto other parts of the extinction ratio characteristic, even if the optical multiplexing module uses semiconductor optical modulators of the reflective type, a uniform modulated output level is obtained and degradation of transmission quality is prevented.

Since the invented optical multiplexing module obtains a uniform modulated output level by controlling one or more direct-current voltages, it has a simpler structure, fewer parts, and a lower cost than does an optical multiplexing module using conventional attenuators or an optical multiplexing module that controls the modulating voltages.

Since the invented semiconductor optical modulator has a separate direct-current voltage electrode for applying a direct-current electric field to the electroabsorptive layer, the optical power level of the output optical signal can be controlled while keeping the modulating voltage within a linear part of the extinction ratio characteristic, so that a uniform modulated output level is obtained.

In the semiconductor optical modulators in the embodiments described, the direct-current voltage electrode is positionally in series with the upper modulating voltage electrode, but the modulators may also have a structure in which the direct-current voltage electrode is positionally in series with the grounded lower electrode.

In the semiconductor optical modulators in the embodiments described above, the direct-current voltage electrode is integrated on the same chip as the modulating voltage electrodes and can be formed together with one of the modulating voltage electrodes, by patterning the same conductive layer, for example, but the direct-current voltage electrode may be formed separately from the modulating voltage electrodes, and need not be integrated onto the same chip.

The semiconductor optical modulators in the embodiments described above have a single direct-current voltage electrode, but a structure in which the direct-current voltage is applied from two or more electrodes is also possible.

The semiconductor optical modulators in the embodiments described above place the direct-current voltage electrode positionally in series with a modulating voltage electrode in the direction of light propagation, on the same semiconductor chip, but structures in which the electrode for applying the direct-current voltage is positioned elsewhere are also possible: for example, the electrode for applying the direct-current voltage may be placed beside and parallel to the modulating voltage electrode.

An optical multiplexing module with a multiplexing factor of two was described in the embodiments above, but the invention can provide similar effects when three or more signals are multiplexed.

Although the embodiments described above were optical multiplexing modules, the structure of the invention can also benefit an optical demultiplexing module that separates a multiplexed optical signal into different component signals, by ensuring that the separated signals are as stable as the multiplexed signal described above.

Those skilled in the art will recognize that further variations are possible within the scope of the appended claims.

What is claimed is:

1. A semiconductor optical modulator, comprising:
    an electroabsorptive layer absorbing incident light responsive to an electric field intensity;
    a pair of modulating voltage electrodes disposed on opposite sides of the electroabsorptive layer, for receiving an applied modulating voltage and generating an electric field that modulates light incident to the electroabsorptive layer; and
    a direct-current voltage electrode for receiving a direct-current voltage and applying a direct-current electric field to the electroabsorptive layer, the direct-current voltage being adjustable to adjust an optical power level of light output from the electroabsorptive layer.

2. The semiconductor optical modulator of claim 1, wherein the direct-current voltage electrode is positionally in series with one of the modulating voltage electrodes in a direction of propagation of said incident light.

3. The semiconductor optical modulator of claim 1, wherein the incident light enters the electroabsorptive layer at a first facet of the semiconductor optical modulator, further comprising a reflective film disposed on a second facet of the semiconductor optical modulator opposite the first facet, for reflecting the incident light back to the first facet for output from the first facet.

4. The semiconductor optical modulator of claim 3, wherein the direct-current voltage electrode is closer to the first facet of the semiconductor optical modulator than to the second facet of the semiconductor optical modulator.

5. The semiconductor optical modulator of claim 3, wherein the direct-current voltage electrode is disposed adjacent to the first facet of the semiconductor optical modulator.

6. An optical multiplexing module having a plurality of semiconductor optical modulators as described in claim 1, comprising:
    a direct-current voltage controller for adjusting the direct-current voltage supplied to the direct-current voltage electrode of at least one of the semiconductor optical modulators, so as to equalize optical power levels of light output from said plurality of semiconductor optical modulators.

7. A method of controlling a semiconductor optical modulator having an electroabsorptive layer absorbing incident light responsive to an electric field intensity, a pair of modulating voltage electrodes disposed on opposite sides of the electroabsorptive layer, for receiving an applied modulating voltage and generating an electric field that modulates light incident to the electroabsorptive layer, and a direct-current voltage electrode for receiving a direct-current voltage and applying a direct-current electric field to the electroabsorptive layer, the method comprising:
    applying the modulating voltage to the pair of modulating voltage electrodes without applying the direct-current voltage to the direct-current voltage electrode; then
    increasing the direct-current voltage applied to the direct-current voltage electrode until the optical power level of the light output from the semiconductor optical modulator reaches a predetermined value.

8. A method of controlling an optical multiplexing module comprising a plurality of semiconductor optical modulators and a like plurality of direct-current voltage controllers paired with the semiconductor optical modulators, each one of the semiconductor optical modulators having an electroabsorptive layer absorbing incident light responsive to an electric field intensity, a pair of modulating voltage electrodes disposed on opposite sides of the electroabsorptive layer, for receiving an applied modulating voltage and generating an electric field that modulates light incident to the electroabsorptive layer, and a direct-current voltage electrode for receiving a direct-current voltage and applying a direct-current electric field to the electroabsorptive layer, the paired one of the direct-current voltage controllers controlling the direct-current voltage supplied to the direct-current voltage electrode of said one of the semiconductor optical modulators, the method comprising:
    applying modulating voltages to the pair of modulating voltage electrodes in each semiconductor optical modulator without applying the direct-current voltage to the direct-current voltage electrode;
    detecting an optical power level of light output from each one of the semiconductor optical modulators;
    detecting a minimum optical power level among the detected optical power levels;
    setting a target optical power level equal to or less than the detected minimum optical power level; and
    controlling the direct-current voltage applied to the direct-current voltage electrode of each one of the semiconductor optical modulators so that light is output at the target optical power level from all of the semiconductor optical modulators.

* * * * *